(12) United States Patent
Phillips et al.

(10) Patent No.: US 7,513,928 B2
(45) Date of Patent: Apr. 7, 2009

(54) HIGH NITROGEN LIQUID FERTILIZER

(76) Inventors: James C. Phillips, 122 Scatterfoot Dr., Peachtree City, GA (US) 30269; Stacey L. Wertz, 2671 Wellington Way, Conyers, GA (US) 30013; Kurt D. Gabrielson, 1710 Lake Lucerne Rd., Lilburn, GA (US) 30047

(*) Notice: Subject to any disclaimer, the term of this patent is extended or adjusted under 35 U.S.C. 154(b) by 182 days.

(21) Appl. No.: 11/549,462

(22) Filed: Oct. 13, 2006

(65) Prior Publication Data
US 2007/0193321 A1    Aug. 23, 2007

Related U.S. Application Data

(63) Continuation-in-part of application No. 11/357,409, filed on Feb. 21, 2006.

(51) Int. Cl.
C05C 9/00        (2006.01)
C05C 9/02        (2006.01)
(52) U.S. Cl. .................. 71/28; 71/30; 71/64.1
(58) Field of Classification Search ........... 71/28, 71/30, 58, 64.1
See application file for complete search history.

(56) References Cited

U.S. PATENT DOCUMENTS

| | | | | |
|---|---|---|---|---|
| 2,415,705 | A | * 2/1947 | Rohner et al. | ......... 71/28 |
| 2,502,996 | A | * 4/1950 | Rohner | ............ 71/30 |
| 3,092,486 | A | 6/1963 | Waters et al. | |
| 3,438,764 | A | * 4/1969 | Church | ............ 71/30 |
| 3,515,533 | A | * 6/1970 | Church | ............ 71/30 |
| 3,640,698 | A | * 2/1972 | Backlund | ......... 71/29 |
| 4,217,127 | A | * 8/1980 | Kono et al. | ......... 71/28 |
| 4,304,588 | A | 12/1981 | Moore | |
| 4,421,545 | A | * 12/1983 | Crews | ............ 71/30 |
| 4,554,005 | A | 11/1985 | Hawkins | |
| 4,559,075 | A | * 12/1985 | Freepons | ......... 71/28 |
| 4,599,102 | A | 7/1986 | Hawkins | |
| 4,776,879 | A | 10/1988 | Hawkins et al. | |
| 4,778,510 | A | 10/1988 | Hawkins | |
| 4,781,749 | A | 11/1988 | Moore | |
| 5,024,689 | A | 6/1991 | Sutton et al. | |
| 5,049,180 | A | 9/1991 | Frazier et al. | |
| 5,266,097 | A | 11/1993 | Moore | |
| 5,364,438 | A | 11/1994 | Weston et al. | |
| 5,674,971 | A | 10/1997 | Graves | |
| 6,048,378 | A | 4/2000 | Moore | |
| 6,114,491 | A | 9/2000 | Dupre et al. | |
| 6,306,194 | B1 | 10/2001 | Wertz et al. | |
| 6,336,772 | B1 | * 1/2002 | Yamashita | ......... 405/128.5 |
| 6,458,747 | B1 | 10/2002 | Kulik | |
| 6,579,338 | B2 | 6/2003 | Wertz et al. | |
| 6,632,262 | B2 | 10/2003 | Gabrielson | |
| 6,826,866 | B2 | * 12/2004 | Moore et al. | ......... 47/48.5 |
| 2002/0043086 | A1 | 4/2002 | Gabrielson | |
| 2004/0168493 | A1 | 9/2004 | Hojjatie et al. | |

OTHER PUBLICATIONS

Urea-Triazone N Characteristics and Uses, Clapp, John C. (Undated) http://www.tkinet.com/Docs/artureatriazonen_uses.pdf.
International Search Report for PCT/US2007/060681 mailed Nov. 6, 2007.

* cited by examiner

*Primary Examiner*—Wayne Langel

(57) ABSTRACT

The present invention is directed to liquid fertilizer composition having a high nitrogen content comprising an aqueous mixture of a urea-formaldehyde resin and a nitrogen fertilizer source selected from the group consisting of urea, ammonium nitrate, and a mixture of urea and ammonium nitrate, wherein the liquid fertilizer possess surprisingly depressed freeze points and salt-out temperatures.

27 Claims, No Drawings

HIGH NITROGEN LIQUID FERTILIZER

CROSS-REFERENCE TO RELATED APPLICATIONS

The present invention claims the benefit, as a continuation-in-part application, of application Ser. No. 11/357,409 filed Feb. 21, 2006, the entire content of which is incorporated herein by reference.

FIELD OF THE INVENTION

The present invention is directed to a liquid fertilizer composition having a high nitrogen content. The invention is particularly directed to an aqueous liquid fertilizer comprising a mixture of a concentrated aqueous solution of a urea-formaldehyde resin and a separate nitrogen fertilizer source selected from the group consisting of ammonium nitrate, urea and a mixture of ammonium nitrate and urea. Liquid fertilizers of the present invention generally possess reduced freeze points and reduced salt-out temperatures.

BACKGROUND OF THE INVENTION

Nitrogen is an essential nutrient for supporting the growth and development of plants, including gasses. Most plants grown to produce food, either for human or animal consumption, are given some form of nitrogen fertilizer. Fertilization of lawns also consumes large amounts of nitrogen fertilizers.

Urea continues to be the most widely used source of nitrogen fertilizer. While most of the urea is used in a granular forms liquid fertilizers using urea in some form continue to occupy an important segment of the fertilizer market. Probably the most common of the urea-based liquid fertilizers are aqueous urea solutions and an aqueous solution of urea and ammonium nitrate, identified as UAN solutions (Ammonium nitrate (AN) solutions without added urea also are used to some extent as a nitrogen fertilizer). The most concentrated of these aqueous solutions contains about 32% by weight nitrogen and is made from about 34 to 35% urea, 46 to 45% ammonium nitrate and the balance water. This concentrated fertilizer solution has a salt-out temperature of about 0 to $-2°$ C., which limits the locations where it can be safely used without added complexity in transportation and storage. The salt-out temperature can be depressed further by increasing the water content and thus sacrificing the total nitrogen concentration of the aqueous fertilizer. So in cold climates, the maximum nitrogen content of such solutions is usually about 28% by weight.

Urea solutions can be prepared at solids contents up to about 50% by weight. Solutions containing about 20% urea are common for lawn fertilizer applications. Such solutions also must be handled appropriately to avoid complications due to urea crystallization (salt out) at low temperatures.

Once applied to the soil, urea in such fertilizers is enzymatically converted to ammonia by urease, an enzyme produced by endogenous microorganisms in the soil. The ammonia then is hydrolyzed rapidly to ammonium ions. In the soil, some of the ammonium ions, whether from the hydrolyzed ammonia or from ammonium nitrate, are assimilated directly by plants, but most are converted to nitrate by the process of nitrification. Once in the nitrate form, the nitrogen is more readily assimilated directly by plants.

Although in widespread use, one of the problems with using urea, AN and UAN solutions as the nitrogen source is that some fraction of the nitrogen is lost after application in various ways, including volatilization as ammonia, denitrification to gaseous nitrogen and nitrate leaching. It has been estimated that the nitrogen loss for such fertilizers falls somewhere between 30% and 60%.

The fertilizer art also has developed a wide variety of liquid fertilizers based on the reaction between urea and formaldehyde. Such urea-formaldehyde resin fertilizers have been formulated and used as a way of providing a more controlled (sometimes characterized as an extended) release of the nitrogen values so that the availability of the nitrogen hopefully is tailored more closely to the time-course nitrogen requirements of the plants. In this way, it is thought that the nitrogen loss commonly associated with the quick release nitrogen fertilizers, such as urea and UAN solutions, can be reduced. However, when formulated at high solids contents to maximize the total nitrogen value, these liquid fertilizers sometimes present their own stability problems.

Notwithstanding these inherent inefficiencies and potential problems, liquid fertilizers based on such formulations continue to be an attractive way of applying nitrogen fertilizers to plants. For that reason, the fertilizer art continues to search for improved compositions and ways for providing a concentrated nitrogen fertilizer liquid that is more stable and less prone to salting-out.

DETAILED DESCRIPTION OF THE INVENTION

The present invention is based on the discovery that the combination of concentrated liquid fertilizers containing controlled release urea-formaldehyde resins with urea solutions, ammonium nitrate (AN) solutions and urea-ammonium nitrate (UAN) solutions can produce a liquid fertilizer composition having an increase in its nitrogen content, relative to the urea, AN and UAN solutions alone, and having an improved thermal (low temperature) stability.

Applicants have specifically discovered that either or both the freezing point and the salt-out temperature of urea solutions, ammonium nitrate (AN) solutions and urea ammonium nitrate (UAN) solutions can be depressed by the addition of liquid fertilizer compositions of concentrated, controlled release urea-formaldehyde resins. In this way, fertilizer solutions of higher solids concentrations (and thus higher nitrogen concentrations) are possible while reducing the risk of salting out.

Thus, the present invention is directed to a liquid fertilizer composition of a high nitrogen content comprising an aqueous solution of a urea-formaldehyde resin, and a separate nitrogen fertilizer source selected from the group consisting of urea, ammonium nitrate and a mixture of urea and ammonium nitrate (also referred to herein as urea-ammonium nitrate). The invention also is directed to the related method of using the liquid fertilizer to fertilize plants, including grasses.

The first component of the liquid fertilizer composition of the present invention is an aqueous concentrated urea-formaldehyde resin solution. This component provides a controlled release nitrogen property to the liquid fertilizer. This component also causes the ultimate liquid fertilizer composition to have improved freeze point and/or salt-out temperature.

In accordance with the present invention, the aqueous concentrated urea-formaldehyde resin solution is prepared by reacting urea and formaldehyde and optionally ammonia under alkaline reaction conditions. The use of a formaldehyde (F) to urea (U) to ammonia (A) mole ratio (F:U:A) in the range of 0.5-4.0:1.0:0.0-1.0 for making the concentrated urea-formaldehyde resin solution, and more usually in the range of 0.5-2.5:1.0:0.0-0.5 is typical. There are a variety of processes known in the prior art for making such resins and in the broadest aspects of the present invention such processes and the resulting aqueous urea-formaldehyde solutions are intended to be embraced by the present invention. It is important that the reaction between the urea, formaldehyde and the optional ammonia be conducted under alkaline reaction conditions so that methylolated urea species are formed. Reaction temperatures between 50 and 100° C. are common, with a reaction time period as short as 30 minutes or as long as 5 hours being possible.

In one preferred embodiment of the present invention, the aqueous urea-formaldehyde resin solution is the aqueous resin solution described and claimed in Gabrielson, U.S. Pat. No. 6,632,262 (the Gabrielson patent). The Gabrielson patent specifically describes a controlled release urea-formaldehyde liquid fertilizer having a nitrogen level of at least 28% by weight nitrogen. According to the Gabrielson patent, formaldehyde (F), urea (U) and ammonia (A) are eventually combined in an aqueous alkaline solution at an F:U:A mole ratio in the range of 0.6-1:1.0:0.25-0.35. The aqueous reaction mixture is heated for at least 0.75 hour at a temperature of 80° C. to 95° C., followed by cooling to less than 50° C. and adjusting the pH of the aqueous liquid to 9.0 to 10.5. Specific materials and procedures for preparing the urea-formaldehyde liquid fertilizer are aptly described in the Gabrielson patent and thus it is not necessary to repeat those teachings here. Instead, the disclosure of the Gabrielson patent, U.S. Pat. No. 6,632,262, is incorporated herein in its entirety by reference.

Briefly, to prepare this particular aqueous urea-formaldehyde resin solution of the Gabrielson patent, U.S. Pat. No. 6,632,262, formaldehyde urea, and ammonia are combined in an alkaline solution at a formaldehyde:urea:ammonia mole ratio of about 0.6-1/1/0.25-0.35, preferably at a mole ratio of about 0.7-0.9/1/0.25-0.3, and most preferably at a ratio of about 0.8:1:0.27. All or most of the water present in the mixture comes from a urea-formaldehyde concentrate, used as the main source of formaldehyde, and the ammonia source (aqua-ammonia). Water also may be added at the completion of the cook to adjust nitrogen content.

The solution is heated to about 80° C. to about 95° C., preferably to about 85° C. to about 90° C., and held for at least about 45 minutes, preferably about 45 minutes to about 120 minutes, more preferably about 60 to about 75 minutes, to ensure some triazone formation and to complete reaction of formaldehyde. Approximately 14 to 20% of the urea in the original mixture is in the form of triazone, preferably about 17 to about 20%. The pH of the solution is at least 7, preferably about 7.5 to about 10.5, and more preferably about 8.5 to about 9.5.

Following the initial reaction, the solution then is cooled to less than about 50° C., preferably to about ambient temperature and the pH is adjusted, as needed, to be within the range of about 9 to about 10.5, preferably from about 9.5 to about 10.

This process provides an aqueous urea-formaldehyde resin solution in which the triazone content, and mono-, di-, and tri-substituted urea species has been optimized for maximum stability.

The pH may be maintained or adjusted by adding a compound, such as triethanolamine, borax sodium or potassium bicarbonate, or sodium or potassium carbonate, preferably triethanolamine, at the start of the reaction that will buffer the pH of the aqueous reaction mixture at the desired pH level. Alternatively, the pH may be maintained by addition of any suitable base during the reaction. While any base can be used to increase the pH of the reaction mix, one common source are alkali metal hydroxides such as potassium hydroxide, lithium hydroxide, and sodium hydroxide.

In this particular embodiment, the aqueous urea-formaldehyde resin solution has a free urea content of 45-55 wt %, a cyclic urea (trazone) content of 14-20 wt %, a monomethylol urea content of 25-35 wt % and a di/trimethylurea content of 5-15 wt % based on the weight of the urea-formaldehyde resin solution wherein the rest of the solution is composed predominately of water. The solids concentration of the aqueous urea-formaldehyde resin solution is typically between 60 and 92% by weight and preferably 80 and 92%, measured as the residual solids following heating at 105° C. The higher solids contents can be obtained by distilling the aqueous resin solution, usually under a vacuum.

In another preferred embodiment of the present invention, a urea-formaldehyde resin of a higher triazone (cyclic urea) content is utilized as the aqueous solution of a urea-formaldehyde resin. Applicants have determined that this higher triazone-containing urea-formaldehyde resin similarly helps to reduce the freeze point and especially the salt out temperature of solutions made with a nitrogen fertilizer source selected from the group consisting of urea, ammonium nitrate and a mixture of ammonium nitrate and urea (e.g., UAN). It is expected that the resulting solutions will exhibit desirable extended-release fertilization profiles as well. Such urea-formaldehyde resins generally have a triazone (cyclic urea) content (including substituted triazone compounds) of at least 20% by weight.

Suitable urea-formaldehyde resins of a higher triazone (cyclic urea) content can be prepared by reacting formaldehyde, urea and ammonia at a mole ratio (F:U:A) in the range of 1.0-4.0:1.0:0.5-1.0. These urea-formaldehyde resins of higher cyclic urea content generally contain at least 20% of triazone and substituted triazone compounds. In such resins, the ratio of cyclic ureas to di- and tri-substituted ureas and mono-substituted ureas varies with the mole ratio of the reactants. For example, a resin prepared at a mole ratio of 2.0:1.0:0.5 (F:U:A) would be expected to produce a solution containing approximately 42% cyclic ureas, approximately 28% di/tri-substituted ureas, approximately 24% mono-substituted ureas, and approximately 5% free urea. Alternatively, a urea-fonnaldehyde resin prepared at a mole ratio of 1.2:1.0:0.5 (F:U:A) would be expected to produce a solution containing approximately 26% cyclic ureas, approximately 7% di/tri-substituted ureas, approximately 32% mono-subslituted ureas, and approximately 35% free urea.

Methods for making such higher triazone-containing urea-formaldehyde resins are known to those skilled in the art. Especially preferred are those urea-formaldehyde resins having a high content of cyclic urea and a low content of free urea. Urea-formaldehyde resins of a high cyclic urea content suitable for use in this preferred aspect of the invention are described, for example, in U.S. Pat. No. 6,114,491, which is hereby incorporated by reference in its entirety As described in Example 1 of this patent, urea-formaldehyde resins with cyclic urea contents in excess of 75% can be prepared.

Still other ways of making triazone (cyclic urea)-containing urea-formaldehyde resins are known to those skilled in the art and in its broadest aspects the present invention is not to be limited to any particular resin type. In this regard, reference is made to U.S. Pat. Nos. 4,554,005; 4,599,102; 4,778,510 and 5,674,971, which describe the preparation of urea-formaldehyde resins containing cyclic ureas. The disclosure of these patents are hereby incorporated by reference in their entirety.

As above, it is preferred to produce a liquid concentrate of the urea-formaldehyde resin having a solids content of above about 60% by weight, preferably above 70% by weight, more preferably above 80% by weight and especially above 90% by weight, measured as the residual solids following heating at 105° C. Such concentrated urea-formaldehyde resins can be prepared by using concentrated raw materials or by distilling an aqueous resin solution made at a lower solids concentration, usually under a vacuum.

As noted above, a solution of the urea, formaldehyde and ammonia reactants is heated to about 80° C. to about 95° C., preferably to about 85° C. to about 90° C., and held for at least about 45 minutes, preferably about 45 minutes to about 120 minutes, more preferably about 60 to about 75 minutes, to ensure triazone formation and to complete reaction of formaldehyde. The pH of the solution is at least 7, preferably about 7.5 to about 10.5, and more preferably about 8.5 to about 9.5.

The other component of the liquid fertilizer composition of the present invention is an aqueous solution of a nitrogen fertilizer source selected from the group consisting of urea, ammonium nitrate (AN) and an aqueous solution of urea-ammonium nitrate (UAN). Urea solutions containing urea in an amount of about 20 to 50% by weight urea are commercially available and are easily made by dissolving a solid source of urea, such as prilled urea, in water. AN solutions containing 21% nitrogen and UAN solutions containing 28%, 30% and 32% nitrogen also are commercially available, and other customized concentrations and formulations call be obtained. The present invention is not limited to any particular source or concentration of urea, AN and/or UAN solutions. A UAN solution generally is prepared from 50% by weight ammonium nitrate and 50% by weight urea. Both continuous and batch-type process can be used for making urea, AN and UAN solutions. In such processes, especially in the case of UAN solutions, concentrated urea and ammonium nitrate solutions are measured, mixed and cooled.

To make the liquid nitrogen fertilizer composition of the present invention, it only is necessary to prepare a blend of an aqueous urea-formaldehyde resin solution and the nitrogen fertilizer source selected from an aqueous solution of urea, an aqueous solution of ammonium nitrate (AN) or an aqueous solution of urea-ammonium nitrate (UAN) with thorough mixing. In the ease of urea in particular, it may be suitable to simply dissolve a solid source of urea into an aqueous urea-formaldehyde resin solution to accomplish the required blending of the aqueous solutions. No specialized mixing equipment is needed. In some circumstances heating may be advisable or necessary to assist the initial, complete dissolution of the blended materials.

In accordance with the present invention, the aqueous urea-formaldehyde resin solution (UF) and the nitrogen fertilizer source selected from the group consisting of an aqueous solution of urea (U), an aqueous solution of ammonium nitrate (AN) or an aqueous solution of urea-ammonium nitrate (UAN) are mixed in a weight ratio (UF:U; U:FAN or UF:UAN) of 90:10 to 10:90, often in the range of 80:20 to 20:80, more often in the range of 75:25 to 25:75 and most often in the range of 30:70 to 70:30, usually depending on the desired ratio of quick release and controlled release nitrogen desired in the final liquid fertilizer formulation. In the case of blends of AN or UAN and concentrated urea-formaldehyde resins of high cyclic urea content (and preferably of low free urea content), the aqueous urea-formaldehyde resin solution and the aqueous solution of ammonium nitrate (AN) or the aqueous solution of urea-ammonium nitrate (UAN) preferably are mixed in a weight ratio (UF:AN or UF:UAN) of 30:70 to 50:50 a desirable extended release nitrogen profile can be obtained.

As noted above, by using a urea-formaldehyde resin of a high cyclic urea content and especially one having a low urea content, preferably a urea-formaldehyde resin having a cyclic urea content above 20%, more preferably above 40% and most preferably above 60%, (and having a urea content of below 20%, preferably below 10% and especially below 5%) an aqueous blend of ammonium nitrate (or urea-ammonium nitrate) and urea-formaldehyde resin having a highly desirable extended nitrogen release profile can be obtained.

A concentrated urea-formaldehyde resin can typically exhibit a nitrogen content of about 25%, so a blend with a UAN solution (32% nitrogen) at a mixing ratio of urea-formaldehyde resin to UAN solution of 30:70 will produce a fertilizer solution of about 30% nitrogen.

A small amount of other additives also can be included in the liquid fertilizer compositions of the present invention. For example, in specific applications, a herbicide, certain micronutrients, a coloring agent or dye and other known fertilizer additives may safely be added to the composition without significantly degrading the thermal stability of the fertilizer composition.

The liquid fertilizer composition of the present invention can be made at high solids concentrations, i.e., at a solids content of at least 50% by weight, at a solids content of at least 60% by weight, at a solids content of at least 70% by weight and at a solids content of at least 80% by weight and thus has a high nitrogen content. The liquid fertilizer composition of the present invention also has a broader temperature range over which it remains fluid with no appreciable precipitation of solids and thus it can be applied to plants, including gasses, in the same manner as any of the conventional liquid urea, AN and UAN fertilizer solutions.

It will be understood that while the invention has been described in conjunction with specific embodiments thereof, the foregoing description and following examples are intended to illustrate, but not limit the scope of the invention. Other aspects, advantages and modifications will be apparent to those skilled in the art to which the invention pertains, and these aspects and modifications are within the scope of the invention.

EXAMPLE 1

Repeated from Example 2 of U.S. Pat. No. 6,632,262

The following ingredients were combined by adding in the following order: UFC, first addition of ammonium hydroxide, first addition of urea, second addition of ammonium hydroxide, and second addition of urea. The combination was heated to 85° C. to 90° C. and held for 60 minutes. The pH was monitored every 15 minutes and adjusted as necessary to maintain a pH between 8.6 and 10 using 25% caustic.

| Ingredient | Concentration | Weight % |
| --- | --- | --- |
| UFC, 85% | 85 | 37.9 |
| Ammonium hydroxide | 28 | 0.5 |
| Urea, prill | 100 | 28.4 |
| Ammonium hydroxide | 8 | 15.4 |
| Urea, prill | 100 | 18.3 |
| Caustic | 25 | to adjust pH |
| Formic Acid | 23 | to adjust pH |
| Water | | to adjust % N |

The combination was then cooled to 25° C. and analyzed for % nitrogen and % free urea (by $^{13}$C-NMR).

Results: % Nitrogen was 29.9; pH was 10.1% Free urea was 50% which corresponds to <50% quick release. Blends exhibited excellent stability.

The nitrogen concentration (and the solids concentration) can be increased by vacuum distillation of the resulting urea-fonnaldehyde resin liquid fertilizer product.

EXAMPLE 2

Repeated from Example 1 of U.S. Pat. No. 6,114,491

Preparation of Urea-formaldehyde Resins of high Cyclic Urea Content a) A urea-formaldehyde resin containing cyclic urea was prepared at a mole ratio of 2.0:1.0:0.5, formaldehyde:urea:ammonia (F:U:A), by charging a reaction vessel with formaldehyde, ammonia, and urea while maintaining the temperature below about 65° C. Once all the reactants were in the reaction vessel, the resulting solution was heated to about 90° C., for about 1 hour until the reaction was complete. Once the reaction was complete, the solution was cooled to room temperature. $C^{13}$-NMR indicated approximately 42.1% of the urea was contained in the triazone ring structure, 28.5% of the urea was di/tri-substituted, 24.5% of the urea was mono-substituted, and 4.9% of the urea was free.

b) A second urea-formaldehyde resin containing cyclic urea was prepared in the same manner as a) except for the mole ratio of 1.2:1.0:0.5 (F:U:A) was used. $C^{13}$-NMR indicated approximately 25.7% of the urea was contained in the triazone ring structure, 7.2% of the urea was di/tri-substituted, 31.9% of the urea was mono-substituted, and 35.2% of the urea was free.

c) A third urea-formaldehyde resin containing cyclic urea was prepared in the same manner as a) except for the mole ratio (F:U:A) of 3:1:1 and it was heated to about 90° C. for 1 hour and then 100° C. for 2 hours. $C^{13}$-NMR indicated approximately 76.0% of the urea was contained in the triazone ring structure, 15.3% of the urea was di/tri-substituted, 8.1% of the urea was mono-substituted, and 0.6% of the urea was free.

d) A fourth urea-formaldehyde resin containing cyclic urea was prepared in the same manner as a) except for the mole ratio (F:U:A) of 4:1:1 and it was heated to about 90° C. for 3 hours and the pH was controlled around 7.5. $C^{13}$-NMR indicated approximately 79.2% of the urea was contained in the triazone ring structure, 17.7% of the urea was di/tri-substituted, 1.6% of the urea was mono-substituted, and 1.5% of the urea was free.

EXAMPLE 3

Aqueous urea-formaldehyde resin solutions prepared substantially in accordance with the procedure of Example 1 were processed (using vacuum distillation) to a solids content of about 80% by weight and 92% by weight respectively. These aqueous urea-formaldehyde resin solutions are identified in the following Table as UF-1 and UF-2, respectively. Mixtures of the urea-formaldehyde resin solutions and a commercially available 21% nitrogen by weight AN solution and a commercially available 32% nitrogen by weight UAN solution were prepared at various weight ratios as shown in the following Table. The total solids content of the various aqueous formulations, measured as the residual solids following heating at 105° C., and the nitrogen content (weight %) of the aqueous formulations also are reported in the Table. The freeze points and the salt out temperatures for the various solutions were measured by the Galbraith Laboratories, Knoxville, Tenn. and also are reported in the following Table.

All of the blends embraced by the present invention stored at a temperature of 23-25° C. have remained free of solids for 180 days.

TABLE

| SAMPLE | % Solids | % N | Freeze Point ° C. | Salt-Out Temp. ° C. |
|---|---|---|---|---|
| UF-1 | 80.7 | 34.6 | — | — |
| UF-2 | 92.1 | 39.7 | — | — |
| UAN | 80.9 | 31.9 | — | 0 |
| 50% UAN/50% UF-1 | 78.8 | 33.2 | <−19.7 | No distinct crystal formation |
| 50% UAN/50% UF-2 | 84.4 | 35.7 | <−20 | No distinct crystal formation |
| 70% UAN/30% UF-1 | 78.8 | 33.0 | <−19.9 | −3.1 |
| 70% UAN/30% UF-2 | 82.1 | 34.2 | <−20 | −6.6 |
| AN | 65.4 | 21.6 | — | 6 |
| 50% AN/50% UF-1 | 72.7 | 29.1 | <−20 | No distinct crystal formation |
| 50% AN/50% UF-2 | 77.8 | 31.2 | <−20 | −10.3 |
| 70% AN/30% UF-1 | 69.5 | 26.8 | <−20 | −3.5 |
| 70% AN/30% UF-2 | 72.6 | 28.4 | <−20 | −0.7 |

The notation "no distinct crystal formation" indicates that the solution remained clear and that there was no visible formation of solids before the solution reached its freeze point.

The data in the Table shows that the addition of the urea-formaldehyde solution (UF-1 and UF-2) to the AN and/or UAN solutions suppressed the salt-out temperatures of both the AN and the UAN solutions. Moreover, because of the higher nitrogen content of the urea-formaldehyde solutions, it was possible to achieve nitrogen contents in the blends above 32% by weight, the maximum nitrogen content of UAN solutions.

EXAMPLE 4

An aqueous urea-formaldehyde resin solution prepared substantially in accordance with the procedure of Example 2a) was processed (using vacuum distillation) to a solids content of about 70% by weight. This aqueous urea-formaldehyde resin solution is identified in the following Table as UFP. Mixtures of the urea-formaldehyde resin solution and a commercially available 32% nitrogen by weight UAN solution (80% by weight solids) were prepared at various weight ratios as shown in the following Table. The freeze points and the salt out temperatures for the various solutions were measured by the Galbraith Laboratories Knoxville, Tenn. and also are reported in the following Table.

For the UAN solutions, salt out occurs within 48 hours at 3° F. (−16° C.); while the 70% UAN-32/30% UFP mixture has remained solids fee for over 120 days at 3° F. (−16° C.).

TABLE

| SAMPLE | % Solids (approx.) | % N | Freeze Point ° C. | Salt-Out Temp. ° C. |
|---|---|---|---|---|
| UFP | 70 | 25 | −40 | <−40 |
| UAN28 | 70 | 28 | — | −10 |
| UAN32 | 80 | 32 | — | 0 |
| 50% UAN32/50% UFP | 75 | 29 | −37 | −27 |
| 70% UAN32/30% UFP | 77 | 30 | −40 | −31 |

The data in the Table shows that the addition of the urea-formaldehyde solution (UFP) to UAN solution suppressed the salt-out temperature.

EXAMPLE 5

Compositions of the present invention were compared against other available sources of nitrogen fertilizer including urea, ESN (a slow release granular product available from Agrium), UAN solution, and Nitamin® 30L (an extended release nitrogen liquid fertilizer product available from Georgia-Pacific). Fertilizer incubation tests were conducted by the International Fertilizer Development Center and the results of their testing is reported below. In particular, presented in the Table below are the six week concentrations of ammonium and nitrate. As understood by those skilled in the art) the longer the fertilizer is in the ammonium form, the more extended is the nitrogen release profile. Additionally, eventual conversion to the nitrate form is desired as once in the nitrate form, the nitrogen is more readily assimilated directly by plants. As shown in the table below, blends of the present invention have especially desirable release profiles similar to Nitamin® 30L (U.S. Pat. No. 6,632,262). For comparison, the high cyclic urea content urea-formaldehyde resin used in preparing the UF/UAN blends of the present invention also was tested and is reported in the table as the Urea-formaldehyde polymer (UFP).

TABLE

| Product | Six Week Ammonium Concentration | Six Week Nitrate Concentration |
|---|---|---|
| Urea | 2 | 80 |
| ESN | 4 | 84 |
| UAN | 10 | 94 |
| Nitamin ® 30L | 33 | 55 |
| 30% Concentrated UF: 70% UAN | 32 | 66 |
| 50% Concentrated UF: 50% UAN | 44 | 50 |
| UFP | 60 | 23 |

While the invention has been described with respect to specific examples including presently preferred modes of carrying out the invention, those skilled in the art will appreciate that there numerous variations and permutations of the above described systems and techniques that fall within the spirit and scope of the invention as set forth in the appended claims.

We claim:

1. An aqueous nitrogen fertilizer solution comprising a mixture of a urea-formaldehyde resin and a nitrogen fertilizer source selected from the group consisting of urea, ammonium nitrate and a mixture of urea and ammonium nitrate, wherein the urea-formaldehyde resin is prepared by reacting urea, formaldehyde and ammonia at a formaldehyde/urea/ammonia mole ratio of 1-4/1/0.5-1.

2. The aqueous nitrogen fertilizer solution of claim 1 wherein the urea-formaldehyde resin is prepared by reacting urea, formaldehyde and ammonia in water under an alkaline reaction condition to yield an aqueous urea-formaldehyde resin solution.

3. The aqueous nitrogen fertilizer solution of claim 1 wherein the urea-formaldehyde resin is prepared by reacting a solution of urea, formaldehyde and ammonia at a temperature from 80° C. to 95° C. and a pH from 7.5 to 10.5 for 45 to 120 minutes.

4. The aqueous nitrogen fertilizer solution of claim 1 wherein the urea-formaldehyde resin has a cyclic urea content, based on 100% resin solids, of greater than 20% by weight.

5. The aqueous nitrogen fertilizer solution of claim 4 wherein the urea-formaldehyde resin has a cyclic urea content, based on 100% resin solids, of greater than 40% by weight.

6. The aqueous nitrogen fertilizer solution of claim 5 wherein the urea-formaldehyde resin has a free urea content, based on 100% resin solids, of less than 10% by weight.

7. The aqueous nitrogen fertilizer solution of claim 1 prepared by blending an aqueous urea-ammonium nitrate solution having a nitrogen content from 28 to 32% by weight with an aqueous solution of a urea-formaldehyde resin.

8. The aqueous nitrogen fertilizer solution of claim 1 wherein an aqueous urea-formaldehyde resin solution (UF) is mixed with a nitrogen fertilizer source selected from the group consisting of an aqueous solution of urea (U), an aqueous solution of ammonium nitrate (AN) and an aqueous solution of urea-ammonium nitrate (UAN) in a weight ratio (UF:U, UF:AN or UF:UAN) of 90:10 to 10:90.

9. The aqueous nitrogen fertilizer solution of claim 1 wherein an aqueous urea-formaldehyde resin solution (UF) is mixed with a nitrogen fertilizer source selected from the group consisting of an aqueous solution of urea (U), an aqueous solution of ammonium nitrate (AN) and an aqueous solution of urea-ammonium nitrate (UAN) in a weight ratio (UF:U, UF:AN or UF:UAN) of 70:30 to 30:70.

10. The aqueous nitrogen fertilizer solution of claim 1 wherein an aqueous urea-formaldehyde resin solution (UF) is mixed with a nitrogen fertilizer source selected from the group consisting of an aqueous solution of urea (U), an aqueous solution of ammonium nitrate (AN) and an aqueous solution of urea-ammonium nitrate (UAN) in a weight ratio (UF:U, UF:AN or UF:UAN) of 30:70 to 50:50.

11. The aqueous nitrogen fertilizer solution of claim 9 wherein the aqueous urea-formaldehyde resin solution has a solid concentration of above 70% by weight.

12. The aqueous nitrogen fertilizer solution of claim 10 wherein the aqueous urea-formaldehyde resin solution has a solid concentration of above 70% by weight.

13. An aqueous nitrogen fertilizer solution of claim 1 having a solids concentration of at least 70% by weight.

14. An aqueous nitrogen fertilizer solution of claim 1 having a solids concentration of at least 80% by weight.

15. An aqueous nitrogen fertilizer solution of claim 4 having a solids concentration of at least 70% by weight.

16. An aqueous nitrogen fertilizer solution of claim 4 having a solids concentration of at least 80% by weight.

17. An aqueous nitrogen fertilizer solution of claim 9 having a solids concentration of at least 70% by weight.

18. An aqueous nitrogen fertilizer solution of claim 9 having a solids concentration of at least 80% by weight.

19. A method of fertilizing comprising applying to a plant the aqueous fertilizer solution of claim 1, 2, 4, 7, 9, 13, 15, or 17.

20. An aqueous nitrogen fertilizer solution comprising a mixture of a urea-formaldehyde resin and a nitrogen fertilizer source selected from the group consisting of urea, ammonium nitrate and a mixture of urea and ammonium nitrate, wherein the urea-formaldehyde resin is prepared by reacting urea, formaldehyde and ammonia in water under an alkaline reaction condition to yield an aqueous urea-formaldehyde resin solution at a formaldehyde/urea/ammonia mole ratio of 0.6-1/1/0.25-0.35.

21. The aqueous nitrogen fertilizer solution of claim 20 wherein the urea-formaldehyde resin is prepared by reacting urea, formaldehyde and ammonia in water under an alkaline reaction condition to yield an aqueous urea-formaldehyde resin solution.

22. The aqueous nitrogen fertilizer solution of claim 20 wherein the urea-formaldehyde resin is prepared by reacting a solution of urea, formaldehyde and ammonia at a temperature from 80° C. to 95° C. and a pH from 7.5 to 10.5 for 45 to 120 minutes.

23. The aqueous nitrogen fertilizer solution of claim 20 prepared by blending an aqueous urea-ammonium nitrate solution having a nitrogen content from 28 to 32% by weight with an aqueous solution of a urea-formaldehyde resin.

24. The aqueous nitrogen fertilizer solution of claim 20 wherein an aqueous urea-formaldehyde resin solution (UF) is mixed with a nitrogen fertilizer source selected from the group consisting of an aqueous solution of urea (U), an aqueous solution of ammonium nitrate (AN) and an aqueous solution of urea-ammonium nitrate (UAN) in a weight ratio (UF:U, UF:AN or UF:UAN) of 90:10 to 10:90.

25. The aqueous nitrogen fertilizer solution of claim 20 wherein an aqueous urea-formaldehyde resin solution (UF) is mixed with a nitrogen fertilizer source selected from the group consisting of an aqueous solution of urea (U), an aqueous solution of ammonium nitrate (AN) and an aqueous solution of urea-ammonium nitrate (UAN) in a weight ratio (UF:U, UF:AN or UF:UAN) of 70:30 to 30:70.

26. An aqueous nitrogen fertilizer solution of claim 20 having a solids concentration of at least 70% by weight.

27. The aqueous nitrogen fertilizer solution of claim 20 wherein the urea-formaldehyde resin has a cyclic urea content, based on 100% resin solids, of 14 to 20% by weight.

\* \* \* \* \*